United States Patent
Zhou et al.

(10) Patent No.: US 9,884,963 B2
(45) Date of Patent: Feb. 6, 2018

(54) FLAME RETARDANT HIGH TEMPERATURE NYLON

(71) Applicant: PolyOne Corporation, Avon Lake, OH (US)

(72) Inventors: Chongfu Zhou, Avon, OH (US); Roger W. Avakian, Solon, OH (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 14/895,249

(22) PCT Filed: Jun. 3, 2014

(86) PCT No.: PCT/US2014/040671
§ 371 (c)(1),
(2) Date: Dec. 2, 2015

(87) PCT Pub. No.: WO2014/197462
PCT Pub. Date: Dec. 11, 2014

(65) Prior Publication Data
US 2016/0102204 A1   Apr. 14, 2016

Related U.S. Application Data

(60) Provisional application No. 61/830,211, filed on Jun. 3, 2013, provisional application No. 61/863,603, filed on Aug. 8, 2013.

(51) Int. Cl.
*C08L 77/02* (2006.01)
*C08L 77/06* (2006.01)

(52) U.S. Cl.
CPC ............. *C08L 77/06* (2013.01); *C08L 77/02* (2013.01)

(58) Field of Classification Search
None
See application file for complete search history.

(56) References Cited

U.S. PATENT DOCUMENTS

| 4,350,793 | A | | 9/1982 | Schmidt et al. | |
|---|---|---|---|---|---|
| 4,659,760 | A | | 4/1987 | van der Meer | |
| 4,788,259 | A | | 11/1988 | Nielinger et al. | |
| 4,888,370 | A | | 12/1989 | Freitag et al. | |
| 5,071,894 | A | | 12/1991 | Weil et al. | |
| 5,436,294 | A | * | 7/1995 | Desio | C08G 69/265 375/E7.222 |
| 6,054,515 | A | * | 4/2000 | Blount | C08K 5/5205 252/609 |
| 6,531,530 | B2 | | 3/2003 | Asano | |
| 7,151,126 | B2 | | 12/2006 | Yang et al. | |
| 8,846,789 | B2 | | 9/2014 | Kim et al. | |
| 9,422,412 | B2 | | 8/2016 | Yu et al. | |
| 2001/0007888 | A1 | * | 7/2001 | Asano | C08K 5/34928 524/115 |
| 2006/0014866 | A1 | * | 1/2006 | Ottenheijm | C08K 5/34928 524/115 |
| 2007/0244231 | A1 | | 10/2007 | Borade et al. | |
| 2014/0308505 | A1 | * | 10/2014 | Schmitt | D01F 6/90 428/221 |

FOREIGN PATENT DOCUMENTS

CN      102516752      *  6/2012

OTHER PUBLICATIONS

Evonik Industries, "VESTAMID HT plus M300 Base Polymer" data sheet, Sep. 2012.

* cited by examiner

*Primary Examiner* — Kara B Boyle
(74) *Attorney, Agent, or Firm* — Michael J. Sambrook; Maria M. Hoke

(57) ABSTRACT

High temperature nylon compounds that are flame retardant using non-halogenated ingredients are disclosed. Polyphenylene ether, or alternatively the combination of polyphenylene ether and bismaleimides, act as synergists with polyphosphonate to achieve a V-0 rating in a UL 94 test at thicknesses of about 3.18 mm or, preferably, about 1.59 mm.

3 Claims, No Drawings

FLAME RETARDANT HIGH TEMPERATURE NYLON

CLAIM OF PRIORITY

This application claims priority from U.S. Provisional Patent Application Ser. No. 61/830,211 filed on Jun. 3, 2013 and U.S. Provisional Patent Application Ser. No. 61/863,603 filed on Aug. 8, 2013, which are incorporated by reference.

FIELD OF THE INVENTION

The present invention concerns high temperature nylon compounds that are flame retardant using non-halogenated ingredients.

BACKGROUND OF THE INVENTION

Thermoplastic compounds, unlike wood, metal, or glass, do not rot, rust, or shatter. For that reason, the world in the past seventy years has seen a revolution in material science arising from the combination of a thermoplastic resin and one or more functional additives to provide specific properties to the resin.

Unlike wood but like metal and glass, at a given temperature, a thermoplastic resin can melt. Its processing versatility benefits from its capacity to mix with the functional additives while in a molten state.

But in use, the exposure of a fully formed thermoplastic article to excessive heat or flame can be quite detrimental to property and person. Flame retardancy is a key attribute for many household items, for example hair dryers, curtains and drapes, water heaters and kitchen appliances. In addition, materials that are non-flammable and non-combustible are critical for many applications in industries, such as electronics, telecommunications, and transportation. Therefore, flame retardants, drip suppressants, mineral fillers, and char formers are frequently added as functional additives to help thermoplastic compounds retard the effects of heat or flame from melting or even burning.

Recently non-halogenated flame retardants have become popular because they minimize the release of halogenated chemicals if the plastic article would begin to degrade, melt, or burn. However, polymer blends using non-halogenated flame retardants are often more difficult to process and have reduced physical and mechanical properties when compared to the original thermoplastic resin.

SUMMARY OF THE INVENTION

What the art needs is a non-halogenated high temperature nylon capable of passing the Underwriters' Laboratories Test No. 94 (UL 94 test) by achieving a V-0 rating.

Even with the variety of functional additives commercially available, it is not a predictable pathway for a person having ordinary skill in the art to find a particular combination of ingredients which, together, can achieve a V-0 rating in a UL 94 test.

The present invention has found that polyphenylene ether, or alternatively the combination of polyphenylene ether and bismaleimides, act as synergists with polyphosphonate to achieve a V-0 rating in a UL 94 test, at thicknesses ranging from about 1.59 mm to 3.18 mm, a task very difficult and unpredictable to achieve.

Starting with a high temperature nylon resin, a non-halogenated flame retardant is combined by mixing or otherwise with other functional ingredients to achieve that coveted V-0 rating.

One aspect of the present invention is a flame retardant high temperature nylon compound, comprising high temperature nylon, polyphosphonate, polyphenylene ether, stabilizer, and optionally polytetrafluoroethylene; wherein the compound has at least about 10 weight percent polyphosphonate and at least about 5 weight percent polyphenylene ether and wherein a combined amount of polyphosphonate and polyphenylene ether is at least about 30 weight percent, so that when the compound is injection molded and tested at a thickness of 3.18 mm or less, the compound has a UL 94 rating of V-0.

Another aspect of the present invention is a flame retardant high temperature nylon compound, comprising high temperature nylon, polyphosphonate, polyphenylene ether, bismaleimides, stabilizer, and optionally polytetrafluoroethylene; wherein the compound has at least about 20 weight percent polyphosphonate and at least about 5 weight percent each of polyphenylene ether and bismaleimides, so that when the compound is injection molded and tested at a thickness of 3.18 mm or less, the compound has a UL 94 rating of V-0.

Features of the invention will be explored below.

EMBODIMENTS OF THE INVENTION

High Temperature Nylon

Nylons, also known as polyamides, are a class of polymers made through the condensation reaction of an amino group and a carboxylic acid or acid chloride group. The result of this condensation reaction is a semi-crystalline polymer having a backbone that contains amide (—CONH—) linkages and that is composed of aliphatic and/or aromatic units.

Non-limiting examples of aliphatic polyamides homopolymers and copolymers are polycaprolactam (nylon 6), poly (hexamethylene adipamide) (nylon 6,6), poly(hexamethylene sebacamide) (nylon 6, 10), poly(11-aminondecanoic acid) (nylon 11), poly(12-aminododecanoic acid) (nylon 12) and the like. Semi-aromatic polyamides are composed of a diamine and typically either terephthalic acid (indicated by the letter "T") or isophthalic acid (indicated by the letter "I"). Non-limiting examples of semi-aromatic polyamides are MXD6, polyamide-6,I/6,T, polyamide-6,6/6,T. Non-limiting examples of aromatic amines are poly(p-phenylene terephthalamide) (PPPT) and poly(m-phenylene isophthalamide) (PMPI).

High temperature nylons are polyamides having a melting point of at least 295° C. or at least 50° C. higher than the traditional version of such nylon type. In addition, high temperature nylons are able to maintain dimensional stability at temperatures as high as 220° C. (melting temperature used for lead-free solder).

Preferred for the invention is VESTAMID® HTplus M 3000, a bio-based polyphthalamide based on PA10T, which is commercially available from Evonik.

Polyphosphonate

Polyphosphonates used in this invention are polymer compounds containing repeating monomer units of $CH_3$—$PO(OH)_2$; $CH_3$—$PO(OH)$—$OR$, where R represents alkyl or aryl groups; or $R^1O$—$PO(R^3)$—$OR^2$, where $R^1$ and $R^2$ are aromatic or aliphatic and $R^3$ represents alkyl $C_1$-$C_6$ or aromatic. Polyphosphonates are useful as flame retardants for polymer compounds. Polyphosphonates can be linear or branched. Preferred are polyphosphonate homopolymers having a polyphosphorous content of greater than about 8 weight percent, a glass transition temperature of at least about 100° C., and a limiting oxygen index of about 50% or higher. Polyphosphonate homopolymers for this invention have a high molecular weight represented by about 10,000 g/mol or higher; and preferably about 20,000 g/mol or higher.

Alternatively, polyphosphonate-co-carbonate polymers can be used for this invention, which have an average molecular weight ranging from about 30,000 to about 50,000; a glass transition temperature ranging from about 120° C. to about 133° C.; a percentage phosphorus content of about 3.8 to about 6.5 weight percent of the polyphosphonate-co-carbonate; and a Limiting Oxygen Index ranging from about 40% to about 50%.

FRX Polymers, Inc. of Chelmsford, Mass., USA manufactures flame retardant polyphosphonates, including polyphosphonate homopolymers, such as Nofia™ HM 1100 (also identified as "FRX 100" in the Examples) and polyphosphonate-co-carbonate polymers, for example Nofia™ C06000 (also identified as "FRX CO 60" in the Examples).

Polyphenylene Ether

Polyphenylene ether (PPE) is a thermoplastic, linear, non-crystalline polyether made by the oxidative condensation of 2,6-dimethylphenol in the presence of a copper-amine-complex catalyst. PPE, also called polyphenylene oxide, is known for its high heat resistance and for its flame retardance as a char former.

Preferred for this invention is PPE having a molecular weight in the range of about 2,000 g/mol to about 20,000 g/mol. Bismaleimides can also be used in combination with PPE, allowing the amount of PPE to be decreased. Non-limiting examples of bismaleimides suitable for this use are N,N'-1,3-phenylene bismaleimide; N,N'-(4-methyl-1,3-phenylene)bismaleimide; 1,1'-(methylenedi-4,1-phenylene)bismaleimide; and 1,4-di(maleimido)butane. PPE is available commercially from Bluestar New Chemical Materials Co., Ltd and under the brand Noryl® from Sabic.

Polytetrafluoroethylene

Polytetrafluoroethylene (PTFE) is known to be useful as a drip suppressant because it tends fibrillate and elongate during injection molding. Fibrils shrink upon exposure to heat from a flame and hence retard dripping of the matrix in which the fibrils reside.

PTFE can have a particle size ranging from about 5 μm to about 25 μm with the possibility of aggregation and agglomeration.

PTFE is commercially available from a number of manufacturers, but the best known is the Teflon™ brand from DuPont which invented the polymer.

Though PTFE is fluorinated, its presence in the compound is not regarded by those having skill in the art of flame retardant compounds as compromising the non-halogenated characteristics of the flame retardant itself because the amount of PTFE present is very minor. Therefore, the use of a fluorinated drip suppressant in the amounts identified in this invention does not disqualify the compound from being considered a non-halogenated flame retarded thermoplastic compound according to the course of conduct in the thermoplastic compound industry.

Additional Additives

A variety of additives known to those skilled in the art can be included in high temperature nylon compounds of the present invention to improve processing or performance properties.

The compound of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (elsevier.com website), can select from many different types of additives for inclusion into the compounds of the present invention.

Non-limiting examples of optional additives include adhesion promoters; biocides; anti-fogging agents; anti-static agents; anti-oxidants; bonding, blowing and foaming agents; dispersants; fillers and extenders; smoke suppressants; impact modifiers; initiators; lubricants; micas; pigments, colorants and dyes; plasticizers; processing aids; release agents; silanes, titanates and zirconates; slip agents, anti-blocking agents; stabilizers; stearates; ultraviolet light absorbers; viscosity regulators; waxes; catalyst deactivators, and combinations of them.

Range of Ingredients

Table 1 shows acceptable, desirable, and preferable ranges of ingredients useful in the present invention, all expressed in weight percent (wt. %) of the entire compound. The compound can comprise, consist essentially of, or consist of these ingredients.

TABLE 1

| Ingredient (Wt. %) | Acceptable | Desirable | Preferable |
|---|---|---|---|
| High temperature nylon | 80-20 | 80-40 | 80-60 |
| Flame retardant polyphosphonate | 10-40 | 10-30 | 10-20 |
| Polyphenylene ether | 10-40 | 10-30 | 10-20 |
| Stabilizer | 0-1 | 0-0.75 | 0-0.5 |
| Polytetrafluoroethylene | 0-3 | 0-2 | 0-1 |
| Optional Additives | 0-3 | 0-2 | 0-1 |

Alternatively, polyphenylene ether may be as low as about 5 wt % when there is at least about 5 wt % bismaleimides and at least about 20 wt % flame retardant polyphosphonate.

Processing

The preparation of compounds of the present invention is uncomplicated. The compound of the present can be made in batch or continuous operations.

Mixing in a continuous process typically occurs in a single or twin screw extruder that is elevated to a temperature that is sufficient to melt the polymer matrix with addition of other ingredients either at the head of the extruder or downstream in the extruder. Extruder speeds can range from about 50 to about 500 revolutions per minute (rpm), and preferably from about 350 to about 450 rpm. Typically, the output from the extruder is pelletized for later extrusion or molding into polymeric articles.

Mixing in a batch process typically occurs in a Banbury mixer that is capable of operating at a temperature that is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (elsevier.com website), one can make articles of any conceivable shape and appearance using compounds of the present invention.

Usefulness of the Invention

Any plastic article which is currently made from a high temperature nylon compound can now be made from the non-halogenated flame retardant compound of this invention. Recently high temperature nylons have been developed to improve the temperature resistance and dimensional stability of traditional nylons.

High temperature nylon articles are sold into the following markets: appliance, building and construction, consumer, electrical and electronic, healthcare, industrial, packaging, textiles, transportation, and wire and cable. Similar to specialty polymers engineered for high temperature applications (e.g. PEEK, LPC), high temperature nylons can be used as a substitute for metal in applications such as connectors and fittings used in distribution transformers; coil forms; encapsulated solenoids; lamp reflectors; stack insulators; fuse holders; brackets; and under-the-hood automotive applications.

High temperature nylon compounds can be shaped by extrusion, molding, calendering, thermoforming, or other means of shaping into any plastic article usable in an interior or confined space where fire can cause personal injury or property damage. Therefore, high temperature nylon compounds that resist burning and dripping are desirable. Literally any plastic article useful in a human-occupied space such as a building, a vehicle, or a tunnel can benefit from the flame retardancy of this high temperature nylon compound.

A person having ordinary skill in the art may decrease the amount of flame retardant polyphosphonate, to reduce cost or to minimize the impact of the flame retardant phosphonate on key physical properties, by leveraging the combined amount of polyphenylene ether and flame retardant polyphosphonate.

By achieving a UL 94 V-0 rating at a thickness as thin as 3.18 mm, it is known that a plastic article having any larger thickness will also achieve a UL 94 V-0 rating.

Underwriters' Laboratories Test No. UL 94 serves as the litmus test for flame retardant thermoplastic compounds. As seen in Table 2, the V-0 rating is distinguished from V-1 and V-2 ratings, which are less acceptable if one is seeking the best flame retardance rating. For certain uses, V-1 is acceptable.

TABLE 2

| Criteria Conditions | V-0 | V-1 | V-2 |
|---|---|---|---|
| Afterflame time for each individual specimen $t_1$ or $t_2$ | ≤10 s | ≤30 s | ≤30 s |
| Total afterflame time for any condition set ($t_1$ plus $t_2$ for the 5 specimens) | ≤50 s | ≤250 s | ≤250 s |
| Afterflame plus afterglow time for each individual specimen after the second flame application ($t_2 + t_3$) | ≤30 s | ≤60 s | ≤60 s |
| Afterflame or afterglow of any specimen up to the holding clamp | No | No | No |
| Cotton indicator ignited by flaming particles or drops | No | No | Yes |

Examples provide data for evaluation of the unpredictability of this invention.

EXAMPLES

Table 3 shows the list of ingredients for Comparative Examples A-E and Examples 1-16.

TABLE 3

| Brand | Chemical | Purpose | Maker |
|---|---|---|---|
| Vestamid ® HT Plus M3000 | High Temperature Nylon | Matrix | Evonik Industries |
| Irganox ® B225 | 50/50 blend of trisarylphosphite and sterically hindered phenolic antioxidant | Heat/processing stabilizers | Ciba |
| TEFLON ® 6C | Polytetrafluoroethylene (PTFE) (CAS #9002-84-0) | Anti-dripping agent | DuPont |
| Nofia ™ HM1100 (FRX-100) | Polyphosphonate homopolymer (CAS #68664-06-2) | Non-halogen flame retardant | FRX Polymers Inc. |
| Nofia ™ CO6000 (FRX CO-60) | Polyphosphonate polycarbonate copolymer (CAS #77226-90-5) | Non-halogen flame retardant | FRX Polymers Inc. |
| Blue Star LXR40 PPE | Polyphenylene ether (CAS #25134-01-4) Mn = 30,000 g/mol~37,000 g/mol | Char former | China National Blue Star Ltd. |
| Low MW PPE | Polyphenylene ether (CAS #25134-01-4) Mn = 10,505 g/mol | Char former | Preparation is described below |
| Noryl ® SA 120-100 | Polyphenylene ether (CAS #25134-01-4) Mn = 2,350 g/mol | Char former | Sabic |
| Noryl ® PPO 630-111 | Polyphenylene ether (CAS #25134-01-4) Mn = 17,300 g/mol | Char former | Sabic |
| Bismaleimides | N,N'-1,3-phenylene bismaleimide (CAS #3006-93-7) | Co-additives | Mitsui Chemicals |

Preparation of Low MW Polyphenylene Ether

The Low Molecular Weight (MW) Polyphenylene Ether (PPE) was produced in a 16 mm Prism twin co rotating extruder by mixing Bluestar PPE (from China National Blue Star, LXR40 PPE), BPA (Acros Organic, CAS #80-05-7) and dicumyl peroxide (AkzoNobel, CAS #80-43-3) at a weight percent of the overall composition of 98.29%, 0.62% and 1.09% respectively. The mixture was extruded at 320° C. in Zone 1, 310° C. in Zone 2 and 300° C. in Zones 3-9, die temperature 300° C., at 250 RPM into pellets. The molecular weight was determined by gel permeation chromatography (GPC) with chloroform as solvent and polystyrene as reference. Based on the GPC UV calculation, the Low MW PPE has an average weight molecular weight of 58,517 g/mol and a number average molecular weight of 10,505 g/mol.

The ingredients in Table 3 of the Comparative Examples A-E and Examples 1-16 were pre-mixed and then fed into the extruder hopper of a Prism TSE 16 mm twin screw extruder and processed according to the conditions shown in Table 4. The temperature in Zones 1-3 was set at 310° C. and the temperature in Zones 4-9 was set at 300° C., with the values reported as measured.

TABLE 4

Extruder Conditions
All Comparative Examples and Examples

| Extruder Type | Prism TSE 16 mm twin screw extruder |
|---|---|
| Zone 1 (set) | 310° C. |
| Zone 2 (set) | 310° C. |
| Zone 3 (set) | 310° C. |
| Zone 4 (set) | 300° C. |
| Zone 5 (set) | 300° C. |
| Zone 6 (set) | 300° C. |
| Zone 7(set) | 300° C. |
| Zone 8 (set) | 300° C. |
| Zone 9 (set) | 300° C. |
| Die | 300° C. |
| RPM | 400 |

The extrudate was pelletized for later molding.

Before molding, the pellets were dried for 16 hours at 80° C. to reduce moisture content.

Using a DeMag molding machine, Table 5 shows the settings used to mold test bars of each Example and Comparative Example having a thickness of about 1.59 mm and about 3.18 mm.

TABLE 5

Molding Conditions
All Comparative Examples and Examples
120T Demag molding machine

| Drying Conditions before Molding: | |
|---|---|
| Temperature (° C.) | 80 |
| Time (h) | 16 |
| Temperatures: | |
| Nozzle (° F.) | 585 |
| Zone 1 (° F.) | 585 |
| Zone 2 (° F.) | 570 |
| Zone 3 (° F.) | 570 |
| Mold (° F.) | 180 |

TABLE 5-continued

Molding Conditions
All Comparative Examples and Examples
120T Demag molding machine

| Oil Temp (° F.) | |
|---|---|
| Speeds: | |
| Screw RPM (%) | 100 |
| % Shot - Inj Vel (in/sec) | 0.8 |
| Pressures: | |
| Injection Pressure (psi) | 1500 |
| Hold Pressure (psi) | 600-800 |
| Back Pressure (psi) | 50 |
| Timers: | |
| Injection Hold (sec) | 5 |
| Cooling Time (sec) | 12 |
| Operation Settings: | |
| Shot Size (mm) | 0.95 |
| Cushion (mm) | 0.1 |

Performance Results

Table 6 shows the amount of ingredients in weight percent of the compound and the flame performance tested for Comparative Examples A-E. Table 7 shows the amount of the ingredients in weight percent of the compound and the flame performance tested for Examples 1-16. Any reference to percent (%) in the discussion of the Examples further below represents the weight percent of the high temperature nylon compound unless specified otherwise. Examples that achieved a UL 94 V-0 rating at 3.18 mm, where then tested at 1.59 mm. Those Examples that are reported to have achieved a UL 94 V-0 rating at 1.59 mm also achieved a UL 94 V-0 rating at 3.18 mm. Each UL rating was verified by two independent tests for each thickness. The lower (i.e. the worse) flame retardancy performance is reported as the UL rating for Tables 6 and 7. Acceptable flammability performance at 3.18 mm was deemed fit for most applications.

TABLE 6

Examples (in weight in percent)

| Ingredients | A | B | C | D | E |
|---|---|---|---|---|---|
| High temperature nylon (HTN) | 99.4 | 59.4 | 59.4 | 74.4 | 64.4 |
| Stabilizer | 0.1 | 0.1 | 0.1 | 0.1 | 0.1 |
| Polytetrafluoroethylene (PTFE) | 0.5 | 0.5 | 0.5 | 0.5 | 0.5 |
| Polyphosphonate homopolymer (FRX-100) | | 40.0 | | 20.0 | 20.0 |
| Polyphosphonate - co-carbonate (FRX Co-60) | | | | | |
| PPE (Mn = 30,000~37,000 g/mol) | | | 40.0 | 5.0 | |
| Bismaleimides | | | | | 15.0 |
| Total | 100 | 100 | 100 | 100 | 100 |
| Ratio of Flame Retardant to PPE | N/A | N/A | N/A | 4:1 | N/A |
| Test Data | | | | | |
| Molded part thickness (mm) | 3.18 | 3.18 | 3.18 | 3.18 | Cannot mold |
| Dripped/Ignited cotton (Y = Yes, N = No) | Y | Y | Y | Y | N/A |
| UL 94 rating | V-2 | V-2 | No UL 94 rating | No UL 94 rating | N/A |

TABLE 7

| Ingredients | Examples (in weight percent) | | | | | | | |
| --- | --- | --- | --- | --- | --- | --- | --- | --- |
| | 1 | 2 | 3 | 4 | 5 | 6 | 7 | 8 |
| High temperature nylon (HTN) | 59.4 | 64.4 | 64.4 | 69.4 | 64.4 | 69.4 | 59.9 | 64.4 |
| Stabilizer | 0.1 | 0.1 | 0.1 | 0.1 | 0.1 | 0.1 | 0.1 | 0.1 |
| Polytetrafluoroethylene (PTFE) | 0.5 | 0.5 | 0.5 | 0.5 | 0.5 | 0.5 | | 0.5 |
| Polyphosphonate homopolymer (FRX-100) | 20.0 | 20.0 | 20.0 | 20.0 | 20.0 | 20.0 | 20.0 | 30.0 |
| Polyphosphonate-co-carbonate (FRX Co-60) | | | | | | | | |
| PPE (Mn = 30,000~37,000 g/mol) | 20.0 | | | | | | 20.0 | 5.0 |
| PPE (Mn = 10,505 g/mol) | | 15.0 | | | | | | |
| PPE (Mn = 2,350 g/mol) | | | 15.0 | 10.0 | | | | |
| PPE (Mn = 17,300 g/mol) | | | | | 15.0 | 10.0 | | |
| Bismaleimides | | | | | | | | |
| Total | 100 | 100 | 100 | 100 | 100 | 100 | 100 | 100 |
| Ratio of Polyphosphonate Flame Retardant to PPE | 1:1 | 2:1.5 | 2:1.5 | 2:1 | 2:1.5 | 2:1 | 1:1 | 6:1 |
| Test Data | | | | | | | | |
| Molded part thickness (mm) | 1.59 | 1.59 | 3.18 | 3.18 | 1.59 | 3.18 | 1.59 | 3.18 |
| Dripped/Ignited cotton (Y = Yes, N = No) | N | N | N | N | N | N | N | N |
| UL 94 rating | V-0 | V-0 | V-0 | V-0 | V-0 | V-0 | V-0 | V-0 |

| Ingredients | 9 | 10 | 11 | 12 | 13 | 14 | 15 | 16 |
| --- | --- | --- | --- | --- | --- | --- | --- | --- |
| High temperature nylon (HTN) | 69.4 | 64.4 | 59.4 | 46.4 | 69.4 | 64.4 | 59.4 | 49.4 |
| Stabilizer | 0.1 | 0.1 | 0.1 | 0.1 | 0.1 | 0.1 | 0.1 | 0.1 |
| Polytetrafluoroethylene (PTFE) | 0.5 | 0.5 | 0.5 | 0.5 | 0.5 | 0.5 | 0.5 | 0.5 |
| Polyphosphonate homopolymer (FRX-100) | 20.0 | 20.0 | | | 20.0 | 15.0 | 10.0 | 10.0 |
| Polyphosphonate-co-carbonate (FRX Co-60) | | | 20.0 | 33.0 | | | | |
| PPE (Mn = 30,000~37,000 g/mol) | 10.0 | 15.0 | 20.0 | 20.0 | 5.0 | 20.0 | 30.0 | 40.0 |
| PPE (Mn = 10,505 g/mol) | | | | | | | | |
| PPE (Mn = 2,350 g/mol) | | | | | | | | |
| PPE (Mn = 17,300 g/mol) | | | | | | | | |
| Bismaleimides | | | | | 5.0 | | | |
| Total | 100 | 100 | 100 | 100 | 100 | 100 | 100 | 100 |
| Ratio of Polyphosphonate | 2:1 | 2:1.5 | 1:1 | 3.3:2 | 4:1 | 1.5:2 | 1:3 | 1:4 |

TABLE 7-continued

Examples (in weight percent)

Flame Retardant to PPE

Test Data

| | | | | | | | | |
|---|---|---|---|---|---|---|---|---|
| Molded part thickness (mm) | 1.59 | 1.59 | 3.18 | 3.18 | 3.18 | 3.18 | 3.18 | 3.18 |
| Dripped/Ignited cotton (Y = Yes, N = No) | N | N | N | N | N | N | N | N |
| UL 94 rating | V-0 | V-0 | V-0 | V-0 | V-0 | V-0 | V-0 | V-0 |

A wide array of screen tests were initially performed to identify a set of formulations for further investigation as molded articles, which are described herein. During these screen tests compounds having zinc borate and melamine cyanurate failed to meet the minimum V-0 UL 94 rating, and as a result melamine-based compounds and boric-acid metallic compounds were excluded from further investigation. The following examples show the unique synergistic relationship between polyphosphonate, PPE and bismaleimides to make flame retardant nylon 6,6 compounds. Comparative Example A shows a composition having more than 99% high temperature nylon (HTN) has a UL 94 V-2 rating. Comparative Examples B and C demonstrate that, independently, neither a significant amount of flame retardant polyphosphonate (40%), nor a significant amount of PPE (40%), added to HTN are able to improve the compound's flame retardancy to reach a UL 94 rating of V-0 for a thickness of 3.18 mm or less.

Examples 1-16 demonstrate that, unexpectedly, the combination of flame retardant polyphosphonate and PPE can result in an HTN compound achieving a UL-94 V-0 rating for a thickness of 3.18 mm or less. Moreover, except for Examples 12 and 16, a UL-94 V-0 rating is achieved using 40 wt % or less of the combination of flame retardant polyphosphonate and PPE, revealing the unique synergist relationship of these ingredients to provide flame retardancy in HTN compounds.

In Examples 1, 10 and 9, PPE (Mn=30,000~37,000 g/mol) was reduced from initially 20% to 15% to 10%, respectively, combined with 20% FRX-100. All of these examples achieved a higher UL 94 rating of V-0 at 1.59 mm. Example 8 decreased the PPE to as little as 5% and increased FRX-100 to 30%, which failed to reach a UL 94 rating of V-0 at 1.59 mm, but did achieve a UL 94 rating of V-0 at 3.18 mm, which is acceptable for certain applications using HTN. Example 13 further demonstrated that the amount of FRX-100 can be decreased to 20% when, in addition to 5% PPE, 5% bismaleimides are added.

Example 2 tested PPE having a molecular weight of 10,505 g/mol at 15% and FRX-100 at 20%, which successfully achieved a higher UL 94 rating of V-0 at 1.59 mm. Examples 3 and 4 tested a PPE having a molecular weight of 2,350 g/mol at 15% and 10% respectively. Although Examples 3 and 4 failed to achieve UL 94 ratings of V-0 at 1.59 mm; these examples achieved V-0 ratings at 3.18 mm.

Examples 5 and 6 tested another type of PPE having a molecular weight of 17,300 g/mol at 15% and 10% respectively. Example 6 achieved a UL 94 V-0 rating at 3.18 mm, and the higher percent of this PPE achieved an even higher UL 94 V-0 at 1.59 mm. The data indicates that PPE molecular weight should be around 10,000 g/mole as the PPE with a molecular weight of 2,000 g/mole tended to drip during flammability testing.

Example 14 reduces the amount of FRX-100 to 15% in combination of 20% PPE, and Examples 15 and 16 reduces the amount of FRX-100 even more to 10% in combination with 30% and 40% PPE, respectively. Examples 14-16 all achieved UL 94 V-0 ratings at 3.18 mm.

Alternatively, Examples 11 and 12 tested a flame retardant polyphosphonate-co-carbonate polymer, using 20% and 33% flame retardant polyphosphonate, respectively, combined with 20% PPE. Examples 11 and 12 achieved UL 94 V-0 ratings at 3.18 mm.

Finally, Example 7 did not contain any polytetrafluoroethylene (PTFE), and still achieved a higher UL 94 rating of V-0 at 1.59 mm, demonstrating PTFE is optional.

The invention is not limited to the above embodiments. The claims follow.

What is claimed is:

1. A flame retardant high temperature nylon compound, consisting of:
   (a) from about 46 to about 70 weight percent, by weight of the compound, of high temperature nylon having a melting point of about 285 ° C., wherein the high temperature nylon is a bio-based polyphthalamide based on PA10T;
   (b) from about 10 to about 33 weight percent, by weight of the compound, of polyphosphonate, wherein the polyphosphonate is a homopolymer, polyphosphonate-co-carbonate polymer, or combination thereof;
   (c) from about 5 to about 40 weight percent, by weight of the compound, of polyphenylene ether or a combination of the polyphenylene ether and bismaleimide;
   (d) about 0.1 weight percent, by weight of the compound, of stabilizer, wherein the stabilizer is a blend of triarylphosphite and sterically hindered phenolic antioxidant; and
   (e) about 0.5 weight percent, by weight of the compound, of polytetrafluoroethylene;
   wherein either (A) provided that the bismaleimide is not present in combination with the polyphenylene ether, the polyphosphonate and the polyphenylene ether are present in a combined amount of at least about 30 weight percent, by weight of the compound, or (B) provided that the bismaleimide is present in combination with the polyphenylene ether, the polyphosphonate is present in an amount of at least about 20 weight percent, by weight of the compound, and each of the polyphenylene ether and the bismaleimide is present in an amount of at least about 5 weight percent, by weight of the compound;

wherein melamine-based compounds and boric-acid metallic compounds are excluded from the compound; and wherein the compound, when injection molded and tested at a thickness of 3.18 mm or less, has a UL 94 rating of V- 0.

2. The flame retardant high temperature nylon compound of claim 1, wherein either (A) provided that the bismaleimide is not present in combination with the polyphenylene ether, the polyphosphonate and the polyphenylene ether are present in a combined amount ranging from about 30 to about 40 weight percent, by weight of the compound, or (B) provided that the bismaleimide is present in combination with the polyphenylene ether, the polyphosphonate is present in an amount of about 20 weight percent, by weight of the compound, and each of the polyphenylene ether and the bismaleimide is present in an amount of about 5 weight percent, by weight of the compound.

3. The flame retardant high temperature nylon compound of claim 1, wherein the polyphosphonate is a homopolymer having a phosphorous content of greater than about 8 weight percent, a glass transition temperature of at least about 100° C., and a limiting oxygen index of about 50% or higher.

* * * * *